US012055900B2

(12) United States Patent
Omura et al.

(10) Patent No.: US 12,055,900 B2
(45) Date of Patent: Aug. 6, 2024

(54) HAND DRIVING DEVICE, ELECTRONIC WATCH, HAND DRIVING METHOD, AND RECORDING MEDIUM

(71) Applicant: CASIO COMPUTER CO., LTD., Tokyo (JP)

(72) Inventors: Tatsuyoshi Omura, Hamura (JP); Makoto Sawada, Nishitokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 923 days.

(21) Appl. No.: 17/102,989

(22) Filed: Nov. 24, 2020

(65) Prior Publication Data

US 2021/0157277 A1 May 27, 2021

(30) Foreign Application Priority Data

Nov. 26, 2019 (JP) ................................ 2019-212816

(51) Int. Cl.
*G04C 3/14* (2006.01)

(52) U.S. Cl.
CPC .................................... *G04C 3/146* (2013.01)

(58) Field of Classification Search
CPC .............. G04C 3/14; G04C 3/146; H02P 8/02
See application file for complete search history.

(56) References Cited

U.S. PATENT DOCUMENTS

| | | | | |
|---|---|---|---|---|
| 6,476,580 B1 * | 11/2002 | Nakamiya | G04C 3/143 368/218 |
| 2011/0013494 A1 * | 1/2011 | Sato | G04C 3/143 368/200 |
| 2011/0249538 A1 * | 10/2011 | Aoki | G04C 3/143 368/187 |
| 2012/0014227 A1 * | 1/2012 | Honmura | H02P 8/34 368/80 |
| 2013/0033260 A1 * | 2/2013 | Nomura | G01R 15/207 324/252 |

(Continued)

FOREIGN PATENT DOCUMENTS

| | | |
|---|---|---|
| CN | 101963781 A | 2/2011 |
| JP | S62-195583 A | 8/1987 |

(Continued)

OTHER PUBLICATIONS

Notice of Reasons for Refusal dated Jan. 4, 2023 received in Japanese Patent Application No. JP 2022-009333.

(Continued)

*Primary Examiner* — Sean Kayes
(74) *Attorney, Agent, or Firm* — Scully, Scott, Murphy & Presser, P.C.

(57) ABSTRACT

A hand driving device includes first to third stepping motors, a driving circuit, a magnetic sensor, and at least one processor. The first to third stepping motors move hands. The driving circuit drives the first to third stepping motors. The processor controls a magnetic sensor, based on movement of the first to third stepping motors, determines whether or not the driving circuit has rotated the stepping motors while the magnetic sensor does not perform measurement, and, when determining that the motors have not rotated, makes the magnetic sensor start measurement.

14 Claims, 9 Drawing Sheets

(56) References Cited

U.S. PATENT DOCUMENTS

| | | | | |
|---|---|---|---|---|
| 2014/0071795 | A1* | 3/2014 | Manaka | H02P 8/38 368/80 |
| 2014/0219068 | A1* | 8/2014 | Kyou | G04C 3/146 368/186 |
| 2017/0277130 | A1* | 9/2017 | Saito | H02P 8/38 |

FOREIGN PATENT DOCUMENTS

| | | | |
|---|---|---|---|
| JP | S63134992 | A | 6/1988 |
| JP | 3514237 | B2 | 3/2004 |
| JP | 2010-043909 | A | 2/2010 |
| JP | 2010-066278 | A | 3/2010 |
| JP | 2010-145204 | A | 7/2010 |
| JP | 2010-204066 | A | 9/2010 |
| JP | 2011-027510 | A | 2/2011 |
| JP | 2013158062 | A | 8/2013 |
| JP | 2016-173284 | A | 9/2016 |
| JP | 2017-134011 | A | 8/2017 |
| JP | 2017-173037 | A | 9/2017 |
| JP | 2019-049436 | A | 3/2019 |
| JP | 2019-168425 | A | 10/2019 |
| JP | 2019176705 | A | 10/2019 |
| WO | 2011/136057 | A1 | 11/2011 |

OTHER PUBLICATIONS

First Office Action dated Oct. 29, 2021 received in Chinese Patent Application No. CN 202011332496.4 together with an English language translation.

Notice of Reasons for Refusal dated May 31, 2022 received in Japanese Patent Application No. JP 2019-212816 together with an Engish language translation.

Notice of Reasons for Refusal dated Dec. 7, 2021 received in Japanese Patent Application No. JP 2019-212816 together with an English language translation.

Notice of Reasons for Refusal dated Apr. 25, 2023 received in Japanese Patent Application No. JP 2022-009333.

* cited by examiner

HAND DRIVING DEVICE, ELECTRONIC WATCH, HAND DRIVING METHOD, AND RECORDING MEDIUM

CROSS-REFERENCE TO RELATED APPLICATION

This application claims the benefit of Japanese Patent Application No. 2019-212816, filed on Nov. 26, 2019, the entire disclosure of which is incorporated by reference herein.

FIELD

This technical field relates to a hand driving device, an electronic watch, a hand driving method, and a recording medium.

BACKGROUND

For example, Unexamined Japanese Patent Application Publication No. 2019-49436 filed in Japan discloses an electronic watch that includes a stepping motor including a rotor, a stator, and a coil in which conductive wire is wound on a coil winding core and an antimagnetic plate that covers at least a portion of the stepping motor.

SUMMARY

The present embodiment includes:

a motor that moves a hand;

a driving circuit that drives the motor;

a magnetic sensor; and at least one processor that controls the magnetic sensor, based on movement of the motor, in which the processor, while the magnetic sensor does not perform measurement, determines whether or not the driving circuit has rotated the motor and, when determining that the motor has not rotated, makes the magnetic sensor start measurement.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a hand driving device and an electronic watch according to the present embodiment will be described with reference to the drawings.

Figure 1:
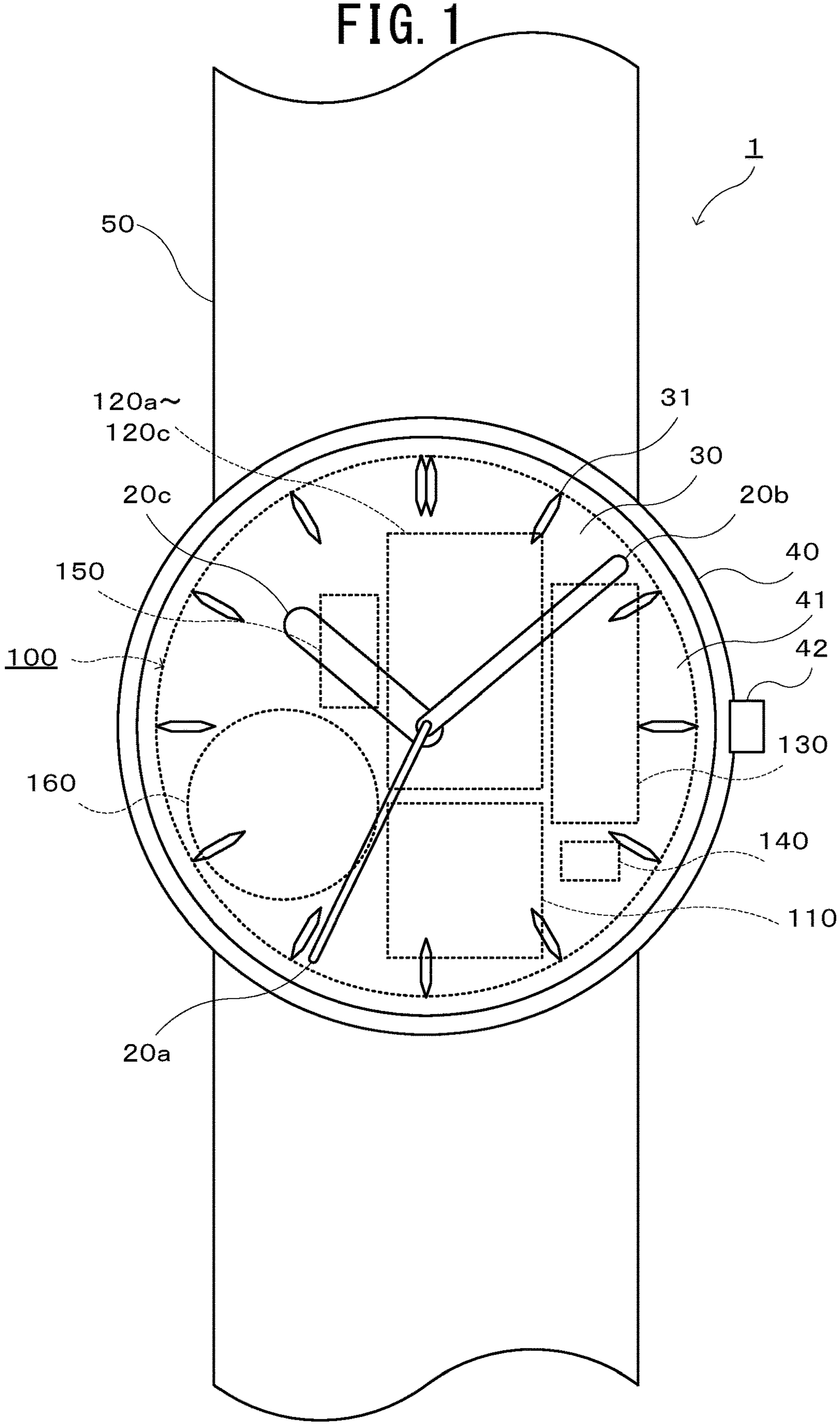
FIG. 1 is a diagram illustrating an electronic watch according to an embodiment.

An electronic watch 1 according to the present embodiment is a wristwatch that includes hands 20*a* to 20*c*, a face 30, a case 40, a band 50, and a hand driving device 100, as illustrated in FIG. 1. The hand driving device 100 is configured to drive the hands 20*a* to 20*c* and includes first to third stepping motors (motors) 120*a* to 120*c*, a driving circuit 130, a timing circuit 140, a magnetic sensor 150, a power supply 160, and a controller 110. Components including the first to third stepping motors 120*a* to 120*c*, the driving circuit 130, the controller 110, and the timing circuit 140 constitute a motor driving device 200.

The hand 20*a*, the hand 20*b*, and the hand 20*c* are a second hand that indicates seconds, a minute hand that indicates minutes, and an hour hand that indicates hours, respectively. The hands 20*a* to 20*c* are attached to a rotation shaft on the face 30 in a freely rotatable manner. The face 30 is a display plate that has hour signs 31 indicating hours. The case 40 is a component that has a cover glass 41 covering the hands 20*a* to 20*c* and the face 30 and a winding crown 42 for adjusting positions of the hands 20*a* to 20*c* and houses the hands 20*a* to 20*c*, the face 30, and the hand driving device 100. The band 50 is a component that is attached to the case 40 and is used for a user to wear the electronic watch 1 on the wrist.

The first stepping motor 120*a* is a component that drives the hand 20*a*, which is a second hand, via one or a plurality of gears. The second stepping motor 120*b* is a component that drives the hand 20*b*, which is a minute hand, via one or a plurality of gears. The third stepping motor 120*c* is a component that drives the hand 20*c*, which is an hour hand, via one or a plurality of gears.

Figure 2:
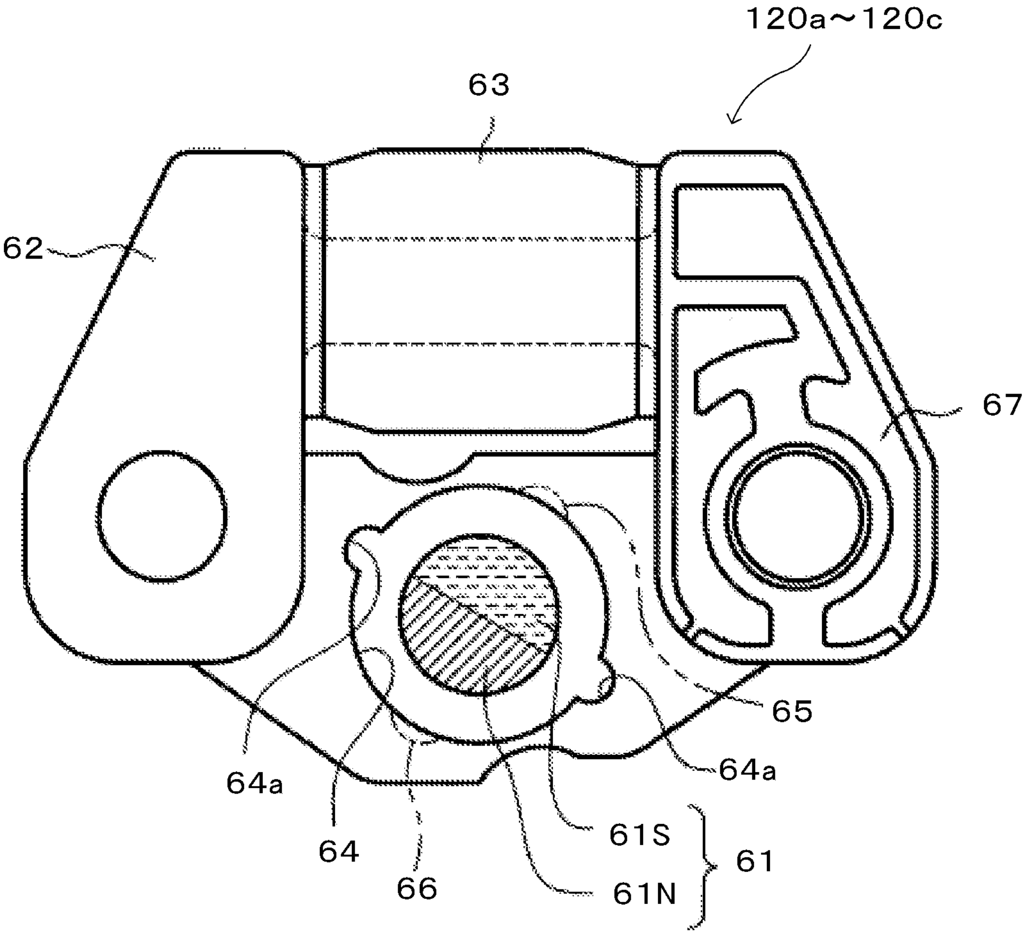
FIG. 2 is a diagram illustrating a stepping motor according to the embodiment.
Figure 3:
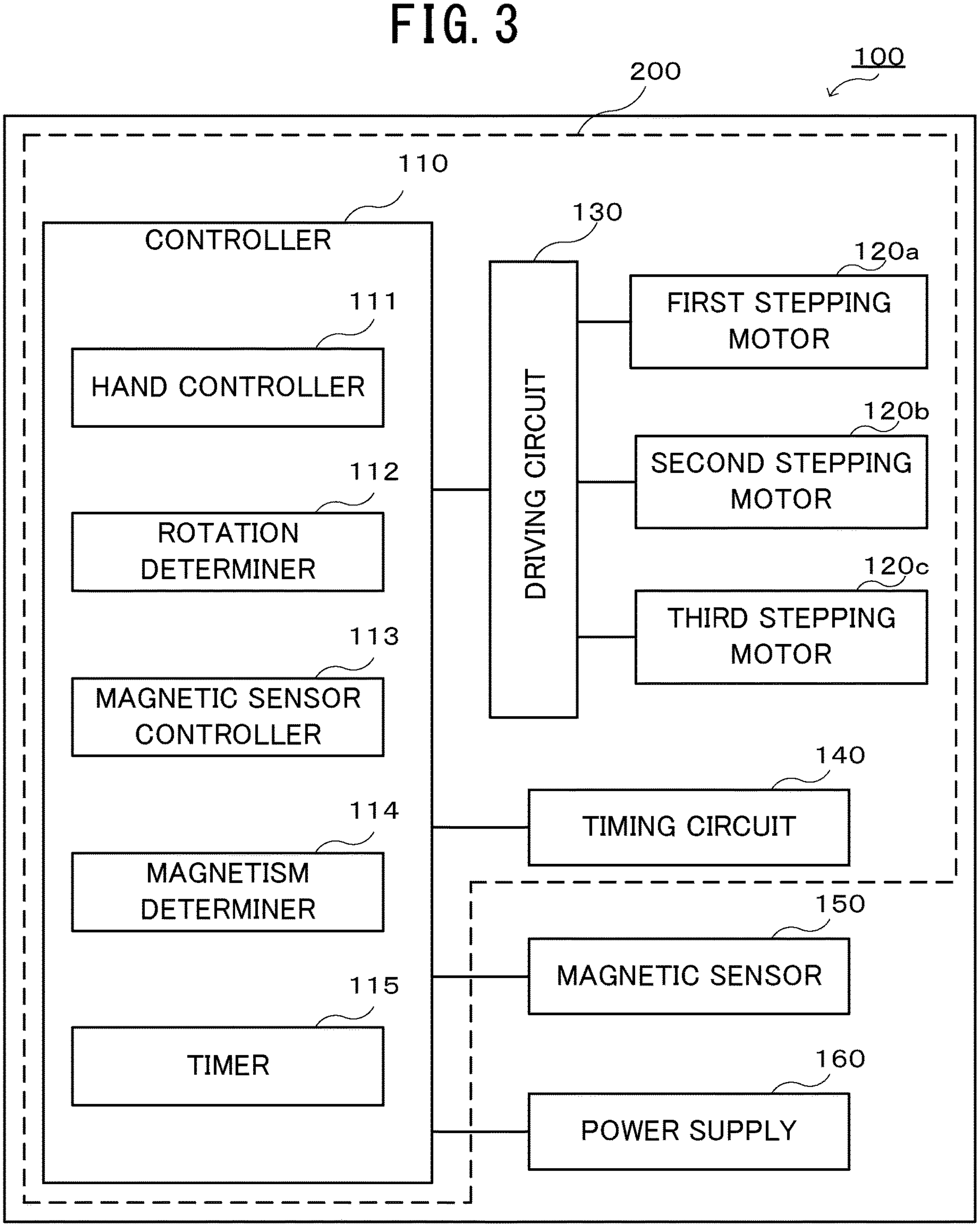
FIG. 3 is a block diagram illustrating a configuration of a hand driving device according to the embodiment.

The first to third stepping motors 120*a* to 120*c* have similar structures, and each thereof includes a rotor 61, a stator 62, and a coil 63, as illustrated in FIG. 2. The rotor 61 is arranged to be rotatable about a not-illustrated shaft that is disposed to the stator 62. The rotor 61 is rotatable by a predetermined step angle in either the clockwise direction or the anti-clockwise direction by application of a driving pulse to the coil 63. To the rotor 61, one or a plurality of gears for moving, for example, the hand 20*a*, which is the second hand, are coupled, and rotation of the rotor 61 causes the gears to rotate.

The stator 62 has an iron core that is formed into a substantially rectangular frame shape and on which the coil 63 is wound and has a circular hole 64 formed, and the rotor 61 is arranged in the hole 64. When current is flowed through the coil 63, magnetic poles appear around regions 65 and 66 in the stator 62. The polarities of the magnetic poles in the regions 65 and 66 are determined according to the direction of the current flowed through the coil 63. The coil 63 is connected to the driving circuit 130 via a terminal block 67.

When voltage is applied to the coil 63 in such a way that magnetic poles repelling an S-pole 61S and an N-pole 61N appear in the regions 65 and 66, the rotor 61 rotates. The stator 62 has two recesses 64*a* formed on the inner peripheral surface of the hole 64, which accepts the rotor 61. The two recesses 64*a* enable a stationary state of the rotor 61 to be maintained.

Each of the first to third stepping motors 120*a* to 120*c* has a highest index torque (holding torque) while the S-pole 61S and the N-pole 61N face the regions 65 and 66, respectively.

As such, while each of the first to third stepping motors 120*a* to 120*c* is in a de-energized state in which no driving pulse is applied to the coil 63, the rotor 61 magnetically stabilizes and stops at a stop position illustrated in FIG. 2 or another stop position rotated 180 degrees from the stop position.

The driving circuit 130 has bridge circuits that drive the first to third stepping motors 120*a* to 120*c* and applies voltage to the coil 63 of each of the first to third stepping motors 120*a* to 120*c* in response to a command from the controller 110. In detail, the driving circuit 130 is a circuit that applies a driving pulse, a correction pulse, and a current difference detection pulse to the coils 63 and has H-bridge circuits that are constructed using switching elements, which are configured using metal-oxide-semiconductor field-effect transistors (MOSFETs), and a resistance element. Some of the switching elements and the resistance element constitute a discharge circuit that discharges energy stored in the coils 63. Terminal voltage across each of the coils 63 is referred to as coil voltage V1, and current flowing through the coil 63 is referred to as coil current H.

The timing circuit 140 is a counter circuit that includes an oscillation circuit and a divider circuit and counts a current time. A circuit that oscillates in combination with an oscillator, such as a crystal, is used as the oscillation circuit, and the oscillation circuit generates a signal of a unique frequency and outputs the signal to the divider circuit. The divider circuit divides the signal input from the oscillation circuit into a signal of a predetermined frequency and outputs the divided signal. The timing circuit 140 counts a current time by counting the number of pulses in the signal of a predetermined frequency output from the divider circuit and adding the number to an initial time.

The magnetic sensor 150 is a component that measures data for deriving strength of a magnetic field and derives and acquires data representing the strength of the magnetic field. The magnetic sensor 150 is a component that also outputs the acquired data to the controller 110. Note that the controller 110 may derive and acquire data representing strength of a magnetic field, based on data for deriving the strength of the magnetic field, including a current value, a resistance value, impedance, and the like, that the magnetic sensor 150 measured. In an initial state, the magnetic sensor 150 is set in an OFF mode in which power for measuring strength of a magnetic field is not supplied. As used herein, the OFF mode includes a mode in which strength of a magnetic field is not measured, such as a case where the magnetic sensor 150 is set in a power-saving mode like a sleep mode. As the magnetic sensor 150, a Hall element that detects strength of a magnetic field by use of the Hall effect, a magnetoresistive effect element that measures the magnitude of a magnetic field by use of a magnetoresistive effect in which electrical resistance of a solid changes when a magnetic field is applied, or the like can be used. The magnetic sensor 150 may also be configured to detect strength of a magnetic field by outputting pulses to wire, such as amorphous wire, and detecting change in the magnetic field by means of a coil.

The power supply 160 has a battery and a DC-DC converter and has a configuration capable of maintaining output voltage constant during operation and making the hand driving device 100 operate continuously and stably for a long period of time.

The controller 110 includes at least one central processing unit (CPU), a read-only memory (ROM), a random access memory (RAM), and the like. The controller 110 functions as a hand controller 111, a rotation determiner 112, a magnetic sensor controller 113, a magnetism determiner 114, and a timer 115 by reading programs stored in the ROM into the RAM and executing the read programs.

The hand controller 111 controls the driving circuit 130 to drive the first to third stepping motors 120*a* to 120*c*, based on the current time timed by the timing circuit 140. The driving circuit 130, controlled by the hand controller 111, outputs a driving pulse to each of the first to third stepping motors 120*a* to 120*c* once every second, thereby making the rotors 61 rotate. The rotation of the rotors 61 causes the hands 20*a* to 20*c* to rotate, each via one or a plurality of gears. However, when, for example, a magnetic field is applied to the electronic watch 1, there are some cases where the driving pulses cannot make the rotors 61 rotate. In such a case, the hand controller 111 is capable of outputting a correction pulse at least either the applied voltage or the pulse width of which is greater than that of a driving pulse. For example, in the case of failure in making the rotors 61 rotate, the hand controller 111 outputs a correction pulse stronger than a driving pulse when it is determined by the magnetism determiner 114 that strength of a magnetic field acquired by the magnetic sensor controller 113 is less than a first criterion value. The first criterion value and control performed when the strength of the magnetic field is determined to be equal to or greater than the first criterion value will be described later. When it is determined by the magnetism determiner 114 that the strength of the magnetic field acquired by the magnetic sensor controller 113 is less than a second criterion value, the hand controller 111 controls the driving circuit 130 to drive the first to third stepping motors 120*a* to 120*c*, based on a period of time during which the rotors 61 have stopped rotating, the period of time being timed by the timer 115. This control causes the positions of the hands 20*a* to 20*c* to move back to positions indicating the current time. The second criterion value will be described later.

The rotation determiner 112 makes the driving circuit 130 output a current difference detection pulse for detecting a magnetic flux density difference, which occurs caused by a difference in stop angles of the magnets between when the rotors 61 have rotated and when not, based on a current difference flowing through the coils 63, detects coil current I1 when the current difference detection pulse is supplied, and determines whether or not the rotors 61 have rotated based on the current difference flowing through the coils 63. Since, when the rotors 61 have rotated, a magnetic field generated by the current difference detection pulse is generated in a direction in which a magnetic field generated by the magnets is weakened, a magnetic field H obtained by adding both magnetic fields together belongs to a region in which influence of magnetic saturation is comparatively small and a slope dB/dH of a tangent line of BH characteristics becomes comparatively large. Since the slope dB/dH of a tangent line indicates differential permeability p, and inductance of each of the coils 63 is proportional to the differential permeability $\mu$, the inductance has a comparatively large value. Therefore, the coil current I1 when a current difference detection pulse is supplied has a comparatively small value. If a peak value of the coil current I1 is equal to or less than a threshold value, the rotation determiner 112 determines that the rotors 61 have rotated.

Width of the current difference detection pulse is preferably set within a range from equal to or greater than 0.01 milliseconds to equal to or less than 1 millisecond and more preferably set within a range from equal to or greater than 0.05 milliseconds to equal to or less than 0.1 milliseconds. With regard to a relative relationship with width of the driving pulse, the width of the current difference detection pulse is preferably set within a range of ⅓ to 1/300 the width of the driving pulse and more preferably set within a range of 1/30 to 1/60 the width of the driving pulse. The reason for these numerical values is because precision of rotation detection deteriorates when the current difference detection pulse is too short and the rotors 61 are caused to move when the current difference detection pulse is too long. Details of the rotation detection method for detecting whether or not the rotors 61 have rotated are disclosed in Unexamined Japanese Patent Application Publication No. 2017-173037.

When it is determined by the rotation determiner 112 that the rotors 61 have not rotated, the magnetic sensor controller 113 turns the magnetic sensor 150 to the ON mode and acquires strength of a magnetic field with the magnetic sensor 150. When it is determined by the magnetism determiner 114 that the strength of the magnetic field is less than the second criterion value, the magnetic sensor controller 113 turns the magnetic sensor 150 to the OFF mode.

The magnetism determiner 114 determines whether or not the strength of the magnetic field acquired by the magnetic sensor controller 113 is equal to or greater than the first criterion value. The magnetism determiner 114 determines whether or not the strength of the magnetic field acquired by the magnetic sensor controller 113 is less than the second criterion value, which is smaller than the first criterion value. The first criterion value is an upper limit for strength of a magnetic field that enables the rotors 61 to rotate when a correction pulse, which is stronger than a driving pulse, is output to each of the first to third stepping motors 120*a* to 120*c*. The second criterion value is a value smaller than an upper limit for strength of a magnetic field that enables the rotors 61 to rotate when a driving pulse is output to each of the first to third stepping motors 120*a* to 120*c*.

The timer 115 times a period of time during which the rotors 61 have stopped rotating. The timer 115 times a period of time during which it is determined by the magnetism determiner 114 that the strength of the magnetic field is equal to or greater than the first criterion value and the rotors 61 have stopped rotating, sums periods of time during which the rotors 61 had stopped rotating, and stores the sum in the RAM. When a correction pulse was applied from the driving circuit 130 and it is determined by the rotation determiner 112 that the rotors 61 have not rotated, the timer 115 times a period of time during which the rotors 61 have not rotated, sums periods of time during which the rotors 61 had not rotated, and stores the sum in the RAM.

Next, hand movement control processing that the hand driving device 100, which has the above-described configuration, performs will be described.

Figure 4:
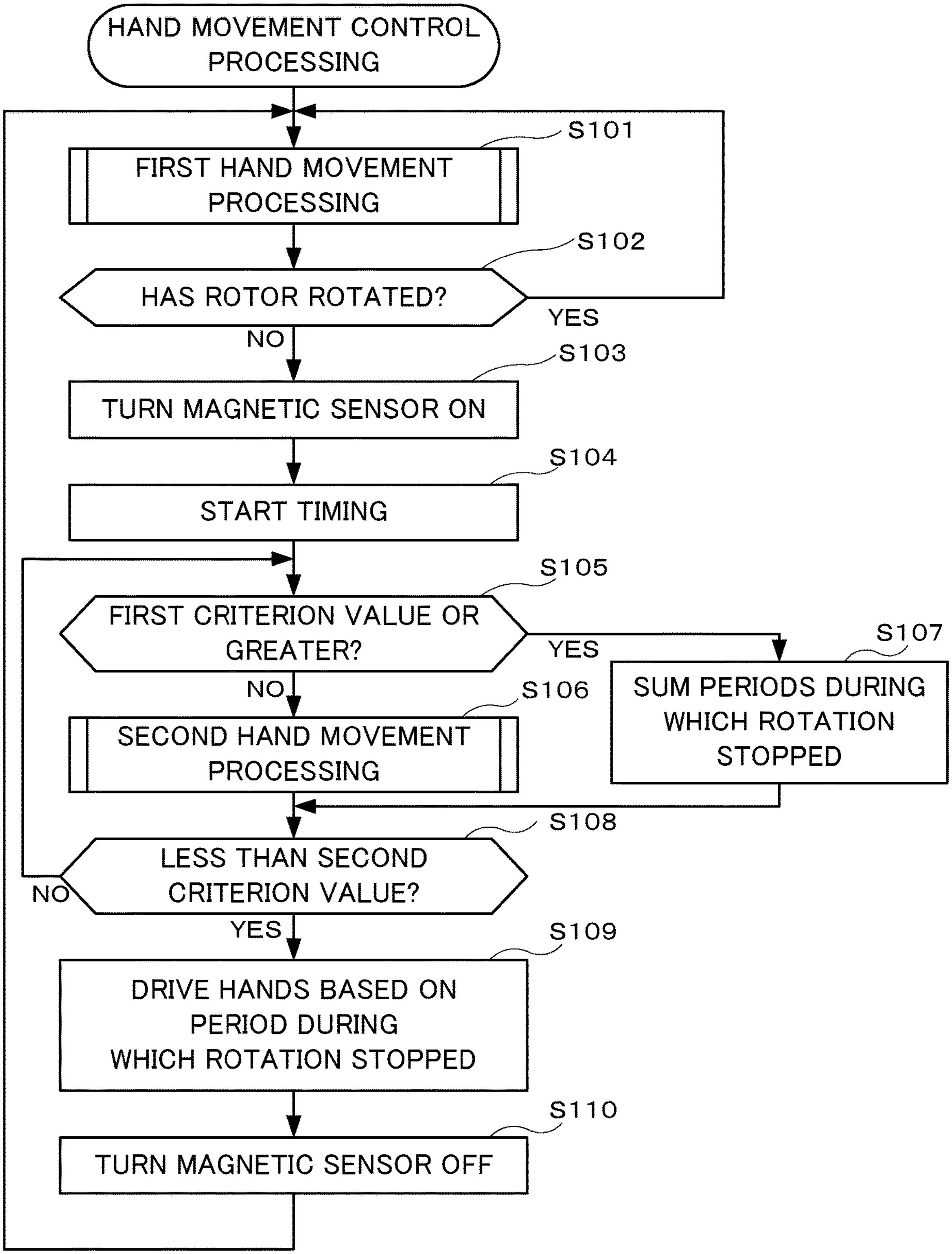
FIG. 4 is a flowchart illustrating hand movement control processing according to the embodiment.

The hand driving device 100 starts the hand movement control processing illustrated in FIG. 4 in response to an instruction to start processing from a user. The hand movement control processing, which the hand driving device 100 performs, will be described below using flowcharts. Note that, in an initial state, the magnetic sensor 150 is set in the OFF mode and does not measure strength of a magnetic field. The positions of the hands 20*a* to 20*c* are adjusted to a current time by means of the winding crown 42 by the user.

Figure 5:
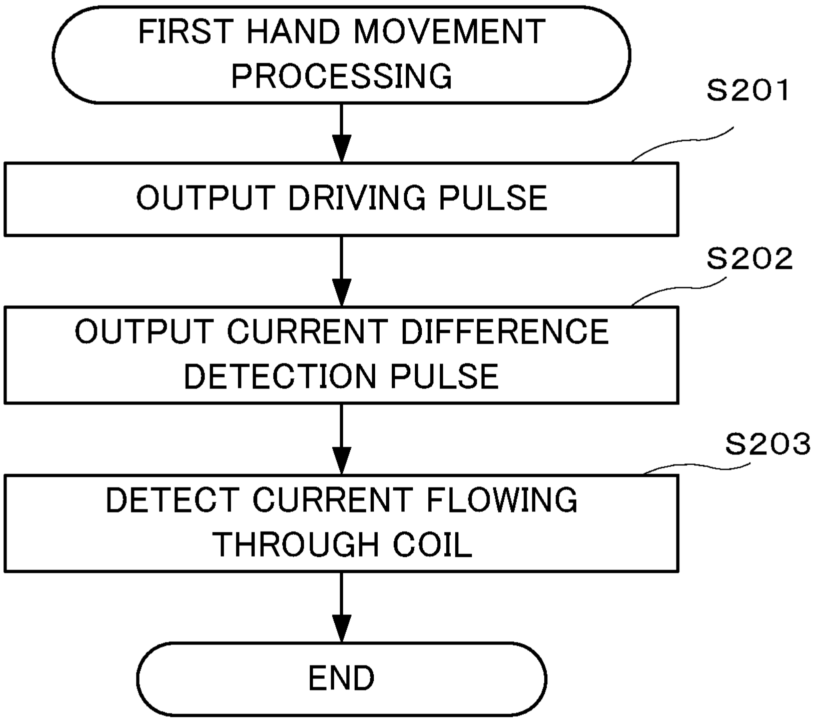
FIG. 5 is a flowchart illustrating a first hand movement processing according to the embodiment.

When the hand movement control processing is started, first hand movement processing is first performed (step S101). When the first hand movement processing illustrated in FIG. 5 is performed, the hand controller 111 controls the driving circuit 130 to output a driving pulse to the coil 63 of each of the first to third stepping motors 120*a* to 120*c* once every second (step S201). Next, the rotation determiner 112 controls the driving circuit 130 to output a current difference detection pulse to each of the coils 63 (step S202). Next, the rotation determiner 112 detects coil current I1 when the current difference detection pulse is supplied (step S203). Subsequently, the process returns to the hand movement control processing illustrated in FIG. 4.

Next, the rotation determiner 112 determines whether or not the rotors 61 have rotated, based on the detected coil current I1 when the current difference detection pulse is supplied (step S102). When the rotation determiner 112 determines that the rotors 61 have rotated (step S102; Yes), the process returns to step S101 and repeats steps S101 and S102.

When the rotation determiner 112 determines that the rotors 61 have not rotated (step S102; No), the magnetic sensor controller 113 turns the magnetic sensor 150 to the ON mode and acquires strength of a magnetic field with the magnetic sensor 150 (step S103). Next, the timer 115 starts timing a period of time during which the rotors 61 have stopped rotating (step S104).

Next, the magnetism determiner 114 determines whether or not the strength of the magnetic field acquired by the magnetic sensor controller 113 is equal to or greater than a first criterion value (step S105). The first criterion value is an upper limit for strength of a magnetic field that enables the rotors 61 to rotate when a correction pulse, which is stronger than the driving pulse, is output to each of the first to third stepping motors 120*a* to 120*c*.

When the magnetism determiner 114 determines that the strength of the magnetic field acquired by the magnetic sensor controller 113 is not equal to or greater than the first criterion value (step S105; No), second hand movement processing is performed (step S106).

Figure 6:
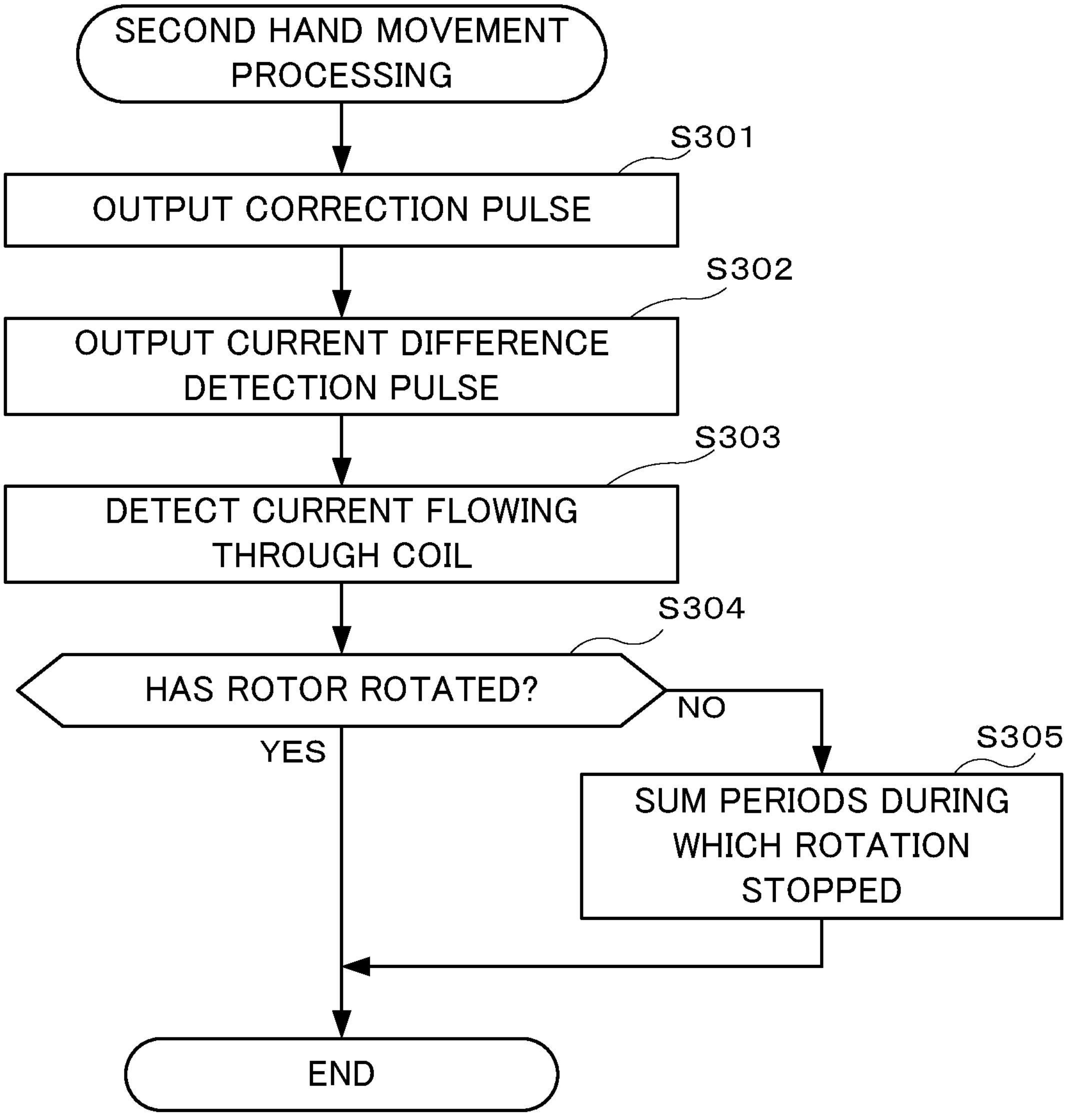
FIG. 6 is a flowchart illustrating a second hand movement processing according to the embodiment.

When the second hand movement processing illustrated in FIG. 6 is performed, the hand controller 111 controls the driving circuit 130 to output a correction pulse, which is stronger than the driving pulse, to the coil 63 of each of the first to third stepping motors 120*a* to 120*c* (step S301). The correction pulse is a pulse at least either the applied voltage or the pulse width of which is greater than that of the driving pulse. Next, the rotation determiner 112 controls the driving circuit 130 to output a current difference detection pulse to each of the coils 63 (step S302). Next, the rotation determiner 112 detects the coil current I1 when the current difference detection pulse is supplied (step S303). Next, the rotation determiner 112 determines whether or not the rotors 61 have rotated based on the detected coil current I1 when the current difference detection pulse is supplied (step S304).

When the rotation determiner 112 determines that the rotors 61 have rotated (step S304; Yes), the process returns to the hand movement control processing illustrated in FIG. 4. When the rotation determiner 112 determines that the rotors 61 have not rotated (step S304; No), the timer 115 sums periods of time during which the rotors 61 had stopped rotating and stores the sum to the RAM (step S305), and the process returns to the hand movement control processing.

When the magnetism determiner 114 determines that the strength of the magnetic field acquired by the magnetic sensor controller 113 is equal to or greater than the first criterion value (step S105; Yes), the timer 115 sums periods of time during which the rotors 61 had stopped rotating and stores the sum to the RAM (step S107).

Next, the magnetism determiner 114 determines whether or not the strength of the magnetic field acquired by the magnetic sensor controller 113 is less than the second criterion value, which is smaller than the first criterion value (step S108). When it is determined that the strength of the magnetic field is not less than the second criterion value (step S108; No), the process returns to step S105 and repeats steps S105 to S108.

Figure 7:
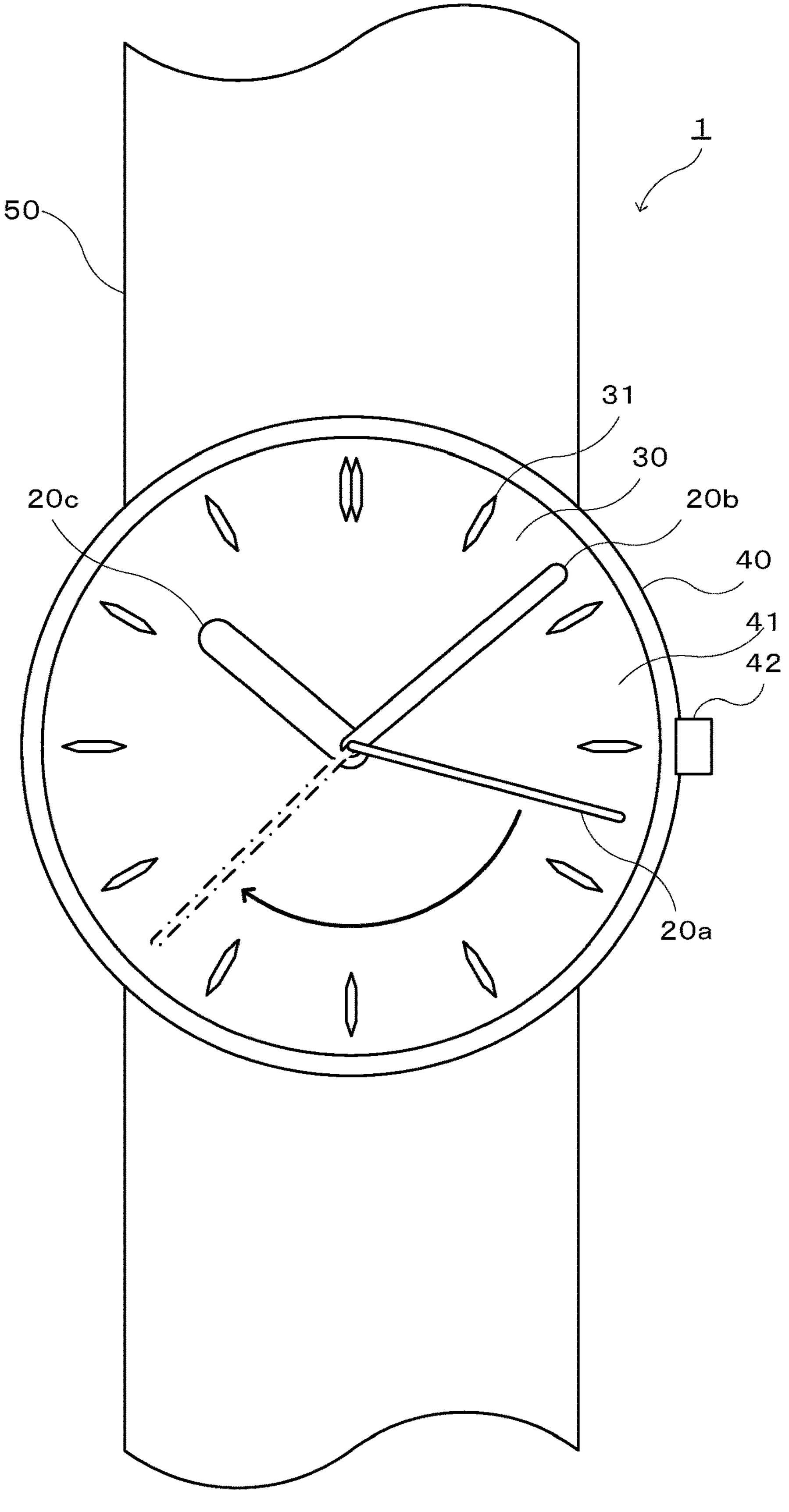
FIG. 7 is a diagram describing the hand movement control processing according to the embodiment.

When it is determined that the strength of the magnetic field is less than the second criterion value (step S108; Yes), the hand controller 111 controls the driving circuit 130 to drive each of the first to third stepping motors 120*a* to 120*c*, based on a period of time during which the rotors 61 have stopped rotating timed by the timer 115 (step S109). This control causes the positions of the hands 20*a* to 20*c* to move back to positions indicating the current time. For example, when it is assumed that, as illustrated in FIG. 7, the rotation of the hand 20*a* has stopped for 20 seconds due to a magnetic field, the timer 115 times a period of time during which the rotor 61 has stopped rotating as 20 seconds. The hand controller 111 controls the driving circuit 130 to drive the first stepping motor 120*a* and advances the hand 20*a* by 20 seconds. As a result, the hand 20*a* is set back to a position indicating the current time. The hands 20*b* and 20*c* are also set back to positions indicating the current time in a similar manner. Next, the magnetic sensor controller 113 turns the magnetic sensor 150 to the OFF mode and stops measurement of the strength of the magnetic field (step S110). Subsequently, the process returns to step S101 and repeats steps S101 to S110.

For example, Unexamined Japanese Patent Application Publication No. 2019-49436 filed in Japan discloses an electronic watch that includes a stepping motor including a rotor, a stator, and a coil in which conductive wire is wound on a coil winding core and an antimagnetic plate that covers at least a portion of the stepping motor. A movement of the electronic watch has a possibility that, when a strong magnetic field is applied, influence of the magnetic field reaches the stepping motor by way of a portion of the movement that is not covered by the antimagnetic plate, causing the rotor to stop rotating. There is a problem in that hands sometimes cannot be moved even when a pulse is output, depending on the magnitude of an external magnetic field and outputting correction pulses many times in such a case causes power consumption to increase.

Although a configuration can be considered in which, by mounting a magnetic sensor on the electronic watch and measuring an external magnetic field with the magnetic sensor, no pulse is output depending on the magnitude of the external magnetic field, there is also a problem in that having such a configuration, in the end, results in keeping the magnetic sensor constantly turned on, thereby causing the power consumption to increase.

However, according to the hand driving device 100 of the present embodiment, the magnetic sensor 150 is set in the OFF mode in the initial state, and, when it is determined by the rotation determiner 112 that the rotors 61 have not rotated, the magnetic sensor controller 113 turns the magnetic sensor 150 to the ON mode.

Because of this control, setting the magnetic sensor 150 in the OFF mode while the rotors 61 normally rotate enables the power consumption to be reduced. Outputting no correction pulse to each of the first to third stepping motors 120*a* to 120*c* when strength of a magnetic field acquired by the magnetic sensor 150 is determined to be equal to or greater than the first criterion value enables the power consumption to be reduced even under the influence of the magnetic field. Outputting a correction pulse that is stronger than the driving pulse to each of the first to third stepping motors 120*a* to 120*c* when the strength of the magnetic field acquired by the magnetic sensor 150 is determined to be less than the first criterion value enables a correct time to be displayed even under the influence of the magnetic field. When the strength of the magnetic field acquired by the magnetic sensor controller 150 is determined to be less than the second criterion value, the positions of the hands 20*a* to 20*c* are set back to positions indicating the current time, based on a period of time during which the rotors 61 have stopped rotating, the period of time being timed by the timer 115. This control enables an accurate time to be displayed even under the influence of a magnetic field. When the strength of the magnetic field acquired by the magnetic sensor 150 is determined to be less than the second criterion value, the magnetic sensor 150 is turned to the OFF mode, which enables the power consumption to be reduced. Therefore, the hand driving device 100 is capable of reducing the power consumption even under the influence of a magnetic field.

(Variations)

Figure 8:
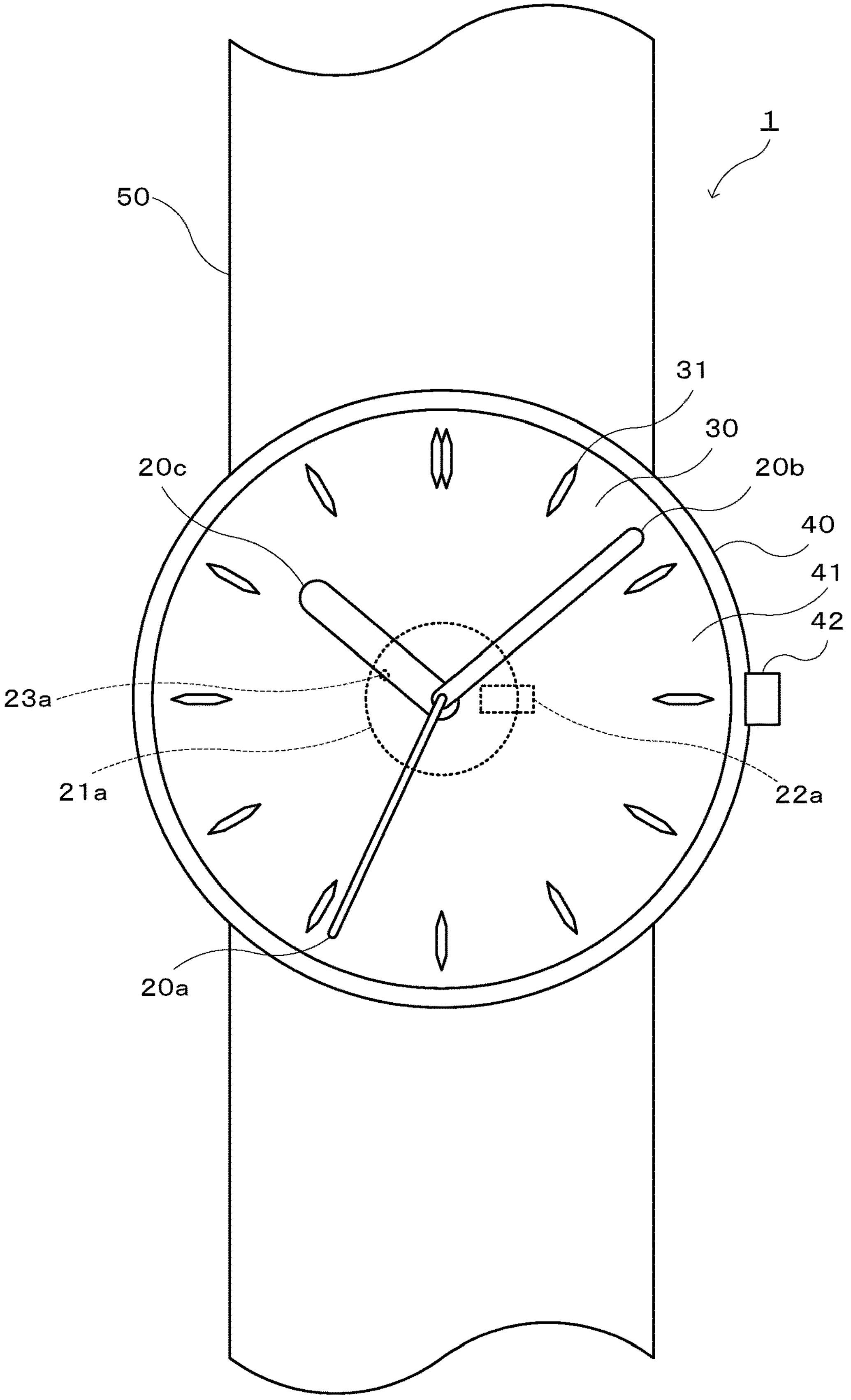
FIG. 8 is a diagram illustrating an electronic watch according to a variation.

In the above-described embodiment, an example in which the positions of the hands 20*a* to 20*c* are set back to positions indicating the current time, based on a period of time during which the rotors 61 have stopped rotating, the period of time being timed by the timer 115, was described. When the period of time during which the rotors 61 have stopped rotating becomes long, there is a possibility that, even when rotors 61 are rotated based on the period of time during which the rotors 61 have stopped rotating, the positions of the hands 20*a* to 20*c* do not move back to the positions indicating the current time. When the period of time during which the rotors 61 have stopped rotating, the period of time being timed by the timer 115, is equal to or greater than a criterion period of time, the first to third stepping motors 120*a* to 120*c* may be controlled in such a way that the positions of the hands 20*a* to 20*c* are reset to initial positions (moved to certain positions) and the positions of the hands 20*a* to 20*c* are adjusted to the positions indicating the current time. In this case, the hand driving device 100 includes a gear 21*a* that rotates the shaft of the hand 20*a*, which is a second hand, and a detector 22*a* that detects a position of the gear 21*a*, as illustrated in FIG. 8. The gear 21*a* includes a detection hole 23*a* and rotates, driven by the first stepping motor 120*a*. The detector 22*a* detects an initial position of the gear 21*a* by detecting light having passed through the detection hole 23*a*. When the period of time during which the rotors 61 have stopped rotating, the period of time being timed by the timer 115, is determined to be equal to or greater than the criterion period of time, the first stepping motor 120*a* rotates the gear 21*a* to a position at which the detection hole 23*a* is detected by the detector 22*a*. This control causes the gear 21*a* to be reset to the initial position. From this position, the hand controller 111 controls the first stepping motor 120*a* to adjust the hand 20*a* to a position indicating the current time timed by the timing circuit 140. The hands 20*b* and 20*c* are also adjusted to positions indicating the current time by means of similar operations.

Figure 9:
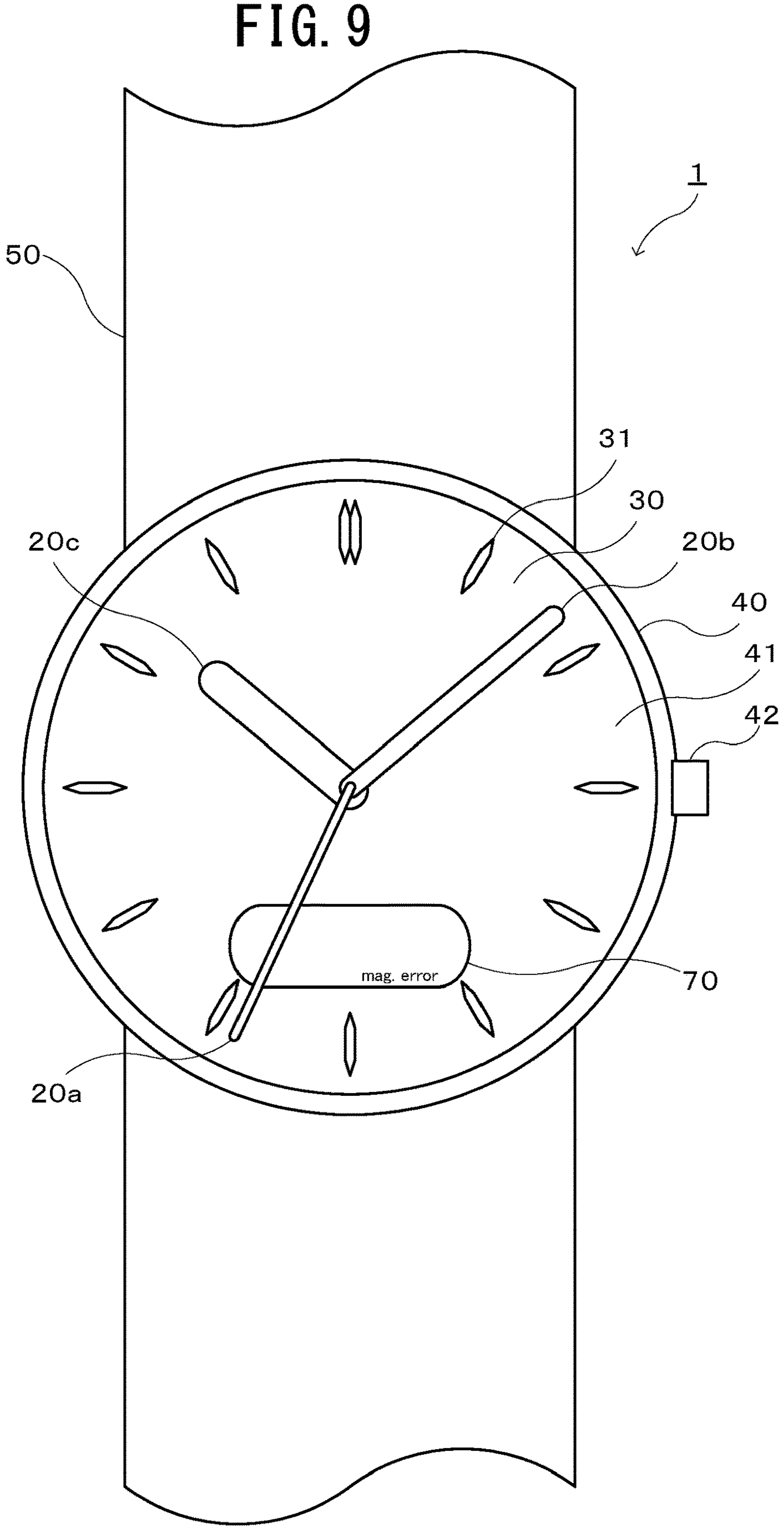
FIG. 9 is a diagram illustrating an electronic watch according to another variation.

In the above-described embodiment, an example in which, when strength of a magnetic field acquired by the magnetic sensor 150 is determined to be equal to or greater than the first criterion value, the first to third stepping motors 120*a* to 120*c* are controlled to stop rotating was described. The strength of the magnetic field acquired by the magnetic sensor 150 may be used for a purpose other than to make the first to third stepping motors 120*a* to 120*c* stop rotating. For example, as illustrated in FIG. 9, when the strength of the magnetic field acquired by the magnetic sensor 150 is determined to be equal to or greater than a third criterion value, the user may be informed that a strong magnetic field is applied. The third criterion value is a value possibly causing an abnormality, such as a malfunction, in the electronic watch 1. In this case, the electronic watch 1 includes a display 70 that displays characters or the like by means of a liquid crystal display or the like, and the controller 110 may display, on the display 70, an error indication indicating that a strong magnetic field is applied. The error indication is, for example, "mag. error". In this case, the third criterion value is preferably set at a value greater than the first criterion value. The user is able to determine whether or not the electronic watch 1 is required to be repaired by seeing the error indication. When the strength of the magnetic field acquired by the magnetic sensor 150 is determined to be equal to or greater than the third criterion value, the user may be informed of information on the magnetic field by means of a sound, such as a buzzer sound, or a vibration. In this case, the third criterion value is preferably set at a value the same as or less than the first criterion value. Such a configuration enables the user to know that a magnetic field has an influence on the electronic watch 1 and move to a place where the electronic watch 1 is not influenced by the magnetic field.

In the above-described embodiment, an example in which, when strength of a magnetic field is determined to be less than the first criterion value, a correction pulse stronger than a driving pulse is output was described. The hand controller 111 may change at least either one of applied voltage or pulse width of the correction pulse in a stepwise manner according to the strength of the magnetic field acquired by the magnetic sensor 150.

In the above-described embodiment, an example in which the rotation determiner 112 determines whether or not the rotors 61 of the first to third stepping motors 120*a* to 120*c* have rotated by outputting current difference detection pulses to the coils 63 and detecting the coil currents I1 was described. The rotation determiner 112 is only required to determine whether or not the rotors 61 of the first to third stepping motors 120*a* to 120*c* have rotated, and potentiometers that convert a rotation angle to an electrical signal, such as voltage, and output the electrical signal may be used as the rotation determiner 112. Alternatively, optical rotation detection devices each of which detects rotation of one of the rotors 61 by radiating light on a rotating body, such as a rotary shaft, that rotates in association with the rotation of the rotor 61 and detecting reflected light reflected by the rotating body may be used.

Although, in the above-described embodiment, an example in which the hands 20*a* to 20*c* are driven by the first to third stepping motors 120*a* to 120*c*, respectively, was described, the hands 20*a* to 20*c* may be driven by a single stepping motor. In this case, the hands 20*a* to 20*c* are adjusted by a plurality of gears in such a way that, when the hand 20*a*, which is a second hand, makes 60 rotations, the hand 20*b*, which is a minute hand, makes one rotation, and, when the hand 20*b*, which is a minute hand, makes 12 rotations, the hand 20*c*, which is an hour hand, makes one rotation.

Although, in the above-described embodiment, an example in which the hands 20*a* to 20*c* are driven by the first to third stepping motors 120*a* to 120*c* was described, the hands 20*a* to 20*c* are only required to be driven to positions indicating a current time and the hands 20*a* to 20*c* may be driven by motors other than stepping motors, such as servo motors. In this case, when strength of a magnetic field acquired by the magnetic sensor 150 is determined to be equal to or less than the first criterion value, the motors may be rotated by larger current or higher voltage.

In the above-described embodiment, an example in which the hand 20*a*, the hand 20*b*, and the hand 20*c* are a second hand that indicates seconds, a minute hand that indicates minutes, and an hour hand that indicates hours, respectively, was described. The hands 20*a* to 20*c* may indicate a value other than time and may indicate temperature, air pressure, a direction, or the like.

A main part of the hand movement control processing that the hand driving device 100, which is configured using the CPU, the RAM, the ROM, and the like, performs can be performed using a general information mobile terminal (such as a smartphone and a tablet PC), a personal computer, or the like instead of using a dedicated system. For example, an information terminal that performs the above-described processing may be configured by storing a computer program for performing the above-described processing in a computer-readable recording medium (a flexible disk, a compact disc read only memory (CD-ROM), a digital versatile disc read only memory (DVD-ROM), or the like), distributing the recording medium, and installing the computer program into an information mobile terminal or the like. An information processing device may be configured by storing the computer program in a storage device that a server device on a communication network, such as the Internet, has and a general information processing terminal or the like downloading the program.

When the hand driving device 100 is achieved through sharing of functions by an operating system (OS) and an application program or collaboration by the OS and the application program, only the application program part may be stored in a recording medium or a storage device.

It is also possible to superimpose a computer program on a carrier wave and distribute the computer program via a communication network. For example, the computer program may be posted on a bulletin board system (BBS) on the communication network, and the computer program may be distributed via the network. The above-described processing may be configured to be able to be performed by starting up and executing the distributed computer program in a similar manner to other application programs under the control of the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A hand driving device comprising:
- a motor configured to move a hand;
- a driving circuit configured to drive the motor;
- a magnetic sensor configured to detect a strength of a magnetic field; and
- at least one processor configured to:
  - set the magnetic sensor to an off state in which power for measuring the strength of the magnetic field is not supplied to the magnetic sensor;
  - while the magnetic sensor is set in the off state:
    - cause the driving circuit to output a driving pulse to the motor; and
    - determine whether or not the motor has rotated in response to the driving pulse;

responsive to a determination that the motor has not rotated in response to the driving pulse:

cause the magnetic sensor to transition from the off state to an on state to start measurement of the strength of the magnetic field; and determine whether the strength of the magnetic field measured by the magnetic sensor is less than a predetermined criterion value; and responsive to a determination that the strength of the magnetic field measured by the magnetic sensor is less than the predetermined criterion value:

determine an amount of time that the motor has not rotated between the determination that the motor has not rotated in response to the driving pulse and the determination that the strength of the magnetic field measured by the magnetic sensor is less than the predetermined criterion value; and cause the driving circuit to drive the motor to move the hand based on the amount of time.

2. The hand driving device according to claim 1, wherein the at least one processor is configured to, responsive to a determination that the motor has rotated, not cause the magnetic sensor to transition from the off state to an on state.

3. The hand driving device according to claim 1, wherein the predetermined criterion value is a first predetermined criterion value, and wherein the at least one processor, when determining that the strength of the magnetic field measured by the magnetic sensor is equal to or greater than a second predetermined criterion value, control the driving circuit to stop rotation of the motor.

4. The hand driving device according to claim 1, wherein the predetermined criterion value is a first predetermined criterion value, wherein the driving circuit is configured to drive the motor by outputting first current or first voltage to the motor, and wherein the at least one processor is configured to, response to a determination that a strength of a magnetic field measured by the magnetic sensor is equal to or less than a second predetermined criterion value, cause the driving circuit to output second current or second voltage that are greater than the first current or the first voltage to the motor.

5. The hand driving device according to claim 1, wherein the at least one processor is configured to, responsive to the determination that the strength of the magnetic field is less than the predetermined criterion value cause the magnetic sensor to transition from the on state to the off state to stop measurement of the strength of the magnetic field.

6. The hand driving device according to claim 1, wherein the at least one processor is configured to:

determine whether the amount of time that the motor has not rotated between the determination that the motor has not rotated in response to the driving pulse and the determination that the strength of the magnetic field measured by the magnetic sensor is less than the predetermined criterion value is equal to or greater than a criterion period of time; and responsive to a determination that the amount of time is equal to or greater than the criterion period of time, cause the driving circuit to drive the motor to move a position of the hand to a certain position to indicate a current time.

7. The hand driving device according to claim 1, wherein the motor comprises is a stepping motor comprising:

a rotor comprising a magnet; and a stator comprising a coil configured to rotate the rotor.

8. The hand driving device according to claim 7, wherein the at least one processor is configured to:

cause the driving circuit output a current difference detection pulse; and determine whether or not the rotor has rotated based on current flowing through the coil.

9. The hand driving device according to claim 7, wherein the at least one processor is configured to change at least one of applied voltage and pulse width of a correction pulse output from the driving circuit to the motor according to strength of a magnetic field acquired from measurement performed by the magnetic sensor.

10. The hand driving device according to claim 1, further comprising:

a potentiometer configured to convert a rotation angle of the motor to an electrical signal and output electrical signal; or an optical rotation detection device configured to detect rotation by radiating light on a rotary shaft of the motor and detecting reflected light reflected by the rotating body, wherein the at least one processor is configured to determine whether or not the motor in response to the driving pulse based on the electrical signal outputted by the potentiometer or the rotation detected by the optical rotation detection device.

11. The hand driving device according to claim 1, wherein the predetermined criterion value is a second predetermined criterion value, and wherein the at least one processor is configured to, response to a determination that the strength of the magnetic field measured by the magnetic sensor is equal to or greater than a second predetermined criterion value, inform a user of information on the magnetic field.

12. An electronic watch comprising:

the hand driving device according to claim 1; and a hand that is driven by the hand driving device.

13. A method for controlling a hand driving device comprising a motor that moves a hand, a driving circuit that drives the motor, and a magnetic sensor that detects a strength of a magnetic field, the method comprising:

setting the magnetic sensor to an off state in which power for measuring the strength of the magnetic field is not supplied to the magnetic sensor;

while the magnetic sensor is set in the off state:

causing the driving circuit to output a driving pulse to the motor; and determining the motor has not rotated in response to the driving pulse;

responsive to a determination that the motor has not rotated in response to the driving pulse:

causing the magnetic sensor to transition from the off state to an on state to start measurement of the strength of the magnetic field; and determining the strength of the magnetic field measured by the magnetic sensor is less than a predetermined criterion value; and responsive to a determination that the strength of the magnetic field measured by the magnetic sensor is less than the predetermined criterion value:

determining an amount of time that the motor has not rotated between the determination that the motor has not rotated in response to the driving pulse and the determination that the strength of the magnetic field measured by the magnetic sensor is less than the predetermined criterion value; and causing the driving circuit to drive the motor to move the hand based on the amount of time.

14. A non-transitory recording medium storing program for controlling a hand driving device comprising a motor that moves a hand, a driving circuit that drives the motor, and a magnetic sensor that detects a strength of a magnetic field, wherein the program causes at least one processor to at least perform:

set the magnetic sensor to an off state in which power for measuring the strength of the magnetic field is not supplied to the magnetic sensor;

while the magnetic sensor is set in the off state:

cause the driving circuit to output a driving pulse to the motor; and determine whether or not the motor has rotated in response to the driving pulse;

response to a determination that the motor has not rotated in response to the driving pulse:

cause the magnetic sensor to transition from the off state to an on state to start measurement of the strength of the magnetic field; and determine whether the strength of the magnetic field measured by the magnetic sensor is less than a predetermined criterion value; and responsive to a determination that the strength of the magnetic field measured by the magnetic sensor is less than the predetermined criterion value:

determine an amount of time that the motor has not rotated between the determination that the motor has not rotated in response to the driving pulse and the determination that the strength of the magnetic field measured by the magnetic sensor is less than the predetermined criterion value; and cause the driving circuit to drive the motor to move the hand based on the amount of time.

* * * * *